United States Patent [19]

Luther

[11] Patent Number: 5,844,568

[45] Date of Patent: Dec. 1, 1998

[54] SYSTEM FOR SELECTIVELY EXTRACTING PIXELS FROM AN IMAGE AND FOR FORMING AN ABSTRACT IMAGE BY DISPLAYING THE EXTRACTED PIXELS

[75] Inventor: Willis J. Luther, Irvine, Calif.

[73] Assignee: Canon Kabushiki Kaisha, Tokyo, Japan

[21] Appl. No.: 779,352

[22] Filed: Jan. 6, 1997

Related U.S. Application Data

[63] Continuation of Ser. No. 214,621, Mar. 18, 1994, abandoned.

[51] Int. Cl.$^6$ .................................................. G06T 5/00
[52] U.S. Cl. ................................................................ 345/432
[58] Field of Search ..................................... 395/131, 132, 395/133, 139; 348/427, 430, 431, 397; 382/54, 62, 56, 232, 236; 345/431, 432, 433, 435, 439, 112, 113, 114

[56] References Cited

U.S. PATENT DOCUMENTS

| | | | |
|---|---|---|---|
| 4,698,778 | 10/1987 | Ito et al. | 358/287 |
| 4,764,805 | 8/1988 | Rabbani et al. | 348/396 |
| 4,774,562 | 9/1988 | Chen et al. | 358/138 |
| 4,837,635 | 6/1989 | Santos | 358/287 |
| 4,876,590 | 10/1989 | Parulski | 358/41 |
| 4,922,342 | 5/1990 | Fonsalas et al. | 358/138 |
| 4,965,751 | 10/1990 | Thayer et al. | 364/521 |
| 5,007,001 | 4/1991 | Lloyd-Williams | 364/518 |
| 5,135,749 | 8/1992 | Katayama | 358/448 |
| 5,138,454 | 8/1992 | Parulski | 358/180 |
| 5,142,616 | 8/1992 | Kellas et al. | 395/135 |
| 5,153,749 | 10/1992 | Katayama | 358/448 |
| 5,153,936 | 10/1992 | Morris et al. | 395/128 |
| 5,200,821 | 4/1993 | Haghiri et al. | 358/133 |
| 5,280,343 | 1/1994 | Sullivan | 358/12 |
| 5,289,296 | 2/1994 | Yamada | 358/530 |

FOREIGN PATENT DOCUMENTS

| | | |
|---|---|---|
| 286157 | 10/1988 | European Pat. Off. . |
| 453802 | 10/1991 | European Pat. Off. . |
| 538056 | 4/1993 | European Pat. Off. . |
| 4-103257 | 4/1992 | Japan . |
| 2215935 | 9/1989 | United Kingdom . |
| 87/05770 | 9/1987 | WIPO . |
| 90/12367 | 10/1990 | WIPO . |
| 92/05655 | 4/1992 | WIPO . |
| 92/08184 | 5/1992 | WIPO . |

OTHER PUBLICATIONS

W.H. Dobbie, "Narrow–Band FM TV Transmission", Institution of Electrical Engineers, Proceedings of International Broadcasting Convention, Brighton, Sep. 23–27, 1988, pp. 300–303.

M.A. Rahgozar and J.P. Allebach, "A General Theory of Time–Sequential Sampling", Signal Processing European Journal, vol. 28, No. 3, Sep. 1992, pp. 253–270.

*Primary Examiner*—Almis R. Jankus
*Attorney, Agent, or Firm*—Fitzpatrick, Cella Harper & Scinto

[57] ABSTRACT

Abstractions of digital images are created and displayed based on the pixels forming the digital image, by selectively extracting less than all pixels from the digital image, and by displaying the extracted pixels against predetermined background pixels such that the extracted pixels are displayed in substantially the same relative positions as in the digital image and such that the predetermined background pixels are displayed in substantially the same relative positions as unextracted pixels in the digital image. The abstract image has a size substantially the same as the size of the digital image. The predetermined background pixels are selected so as to enhance viewability of the abstract image, or the background pixels may be pixels from previous displays of image extractions so as to allow a fill-in effect for single digital images or an abstract motion video effect for digital images that comprise frames in a digital motion video sequence. Since fewer than all pixels of the digital image are extracted, overall time for retrieval, transmission, and display of the abstract image is significantly shortened.

154 Claims, 10 Drawing Sheets

"SPARKLE" FILL

ORIGINAL
```
        x x x x
      x x x x x x
    x x x x x x x x
  x x x x x x x x x x   } 60
x x x x x x x x x x x
x x x x x x x x x
x x x x x x x
x x x x x
x x x
x
```

ABSTRACT
```
          . x . .
        x . x . .      } 62
      . x . x . .
    x . x . x . . .
  . x . x . x . . .
x . x . x . . . .
x . x . . . .
. x . . . .
x . . .
.
```
61

PASS #1   FIG. 5A

```
        . x . . x
      x . x . x
    . x . x . x     } 63
  x . x . x . x
. x . x . x
x . x .
x .
```

PASS #2   FIG. 5B

```
              x x   x x
            x x x x x x
          x x x x x x x
        x x x x x x x .    } 64
      x x x x x . x . .
    x x x x . x . .
  x x x . x . .
. x . . .
```

PASS #3   FIG. 5C

```
              x x x x
            x x x x x
          x x x x x x
        x x x x x x x     } 65
      x x x x x x x
    x x x x x x
  x x x x x
x x x x
```

PASS #4   FIG. 5D

FIG. 7A FRAME #1

FIG. 7B FRAME #2

FIG. 7C FRAME #3

FIG. 7D FRAME #4

FIG. 7E FRAME #5

FIG. 8

SYSTEM FOR SELECTIVELY EXTRACTING PIXELS FROM AN IMAGE AND FOR FORMING AN ABSTRACT IMAGE BY DISPLAYING THE EXTRACTED PIXELS

This application is a continuation of application Ser. No. 08/21.21, filed Mar. 18, 1994 now abandoned.

BACKGROUND OF THE INVENTION

1. Field of the Invention

The present invention pertains to an image processing system which displays computerized images such that less than all of the pixels in the image are displayed. More particularly, the invention concerns a system which undersamples the pixels in an image and displays those pixels against a predetermined background, thereby providing a computer operator with a quick abstract view of the image rather than the full image.

2. Description of the Related Art

With recent advances in computer storage media, it has become more common place to store images digitally rather than only in analog form. Thus, for example, optical disk technology such as CD-ROMs has made it possible to store full images digitally so that those images may be retrieved, processed and displayed in a digital computer.

Despite advances in storage media technology, it is still difficult to retrieve and display digital images quickly. For example, 307,200 8-bit bytes are required to store a 640×480 pixel gray scale or color image if 256 gray levels (or 256 colors, both corresponding to an eight-bit byte) are stored for each pixel. To transmit those 307,200 bytes over an ordinary voice telephone line, such as by a 9600 baud modem, more than four minutes of transmission time is needed. Clearly, such a delay is unacceptable, especially in a situation where a computer operator is browsing through a number of images so as to locate a particular one.

Even in situations where it is possible to access, transmit and display images more quickly, the delays caused by those processes can still cause difficulties. Consider, for example, a situation in which images are retrieved locally for local display, such as in a stand-alone computer or in a local area network of computers. In such a system, it is possible to access and display a single image with acceptably short delays. Without specialized hardware, however, it is not possible to access and to display full motion video images. More particularly, accessing and displaying 24-bit color images at 30 frames per second, with each frame containing 640×480 pixels, requires 221,000,000 bit operations per second. This exceeds the capability of existing personal computing equipment.

In order to access and display digital images without introducing unacceptable delays, conventional systems have employed compression routines such as JPEG for still images and MPEG for motion images. Use of such compression routines however, ordinarily entails a special hardware component for compression and for decompression, and undesirably complicates the system.

SUMMARY OF THE INVENTION

It is an object of the present invention to address the foregoing difficulties.

According to the invention, rather than accessing and displaying a full image, only an abstract of the image is accessed and displayed. Displaying abstractions avoids the delays normally associated when full images rather than the abstractions are accessed and displayed. Abstractions are obtained by undersampling the pixels in the image, such as by selecting only every ninth pixel in each 3×3 cluster of pixels in the image. The undersampled pixels are displayed against a predetermined background such as a full white or full black background, and the undersampled pixels are displayed in their proper positional relation with respect to each other so that the abstract image does not enlarge or reduce the original image.

In the case of still images or individual frames of motion video, the abstract image may be supplemented by subsequently accessing and displaying as-yet-un-sampled pixels to fill in the predetermined background, thereby creating a "sparkle" effect. The fill-in process may be performed automatically, for example, when an operator dwells for more than a predetermined length of time on a particular image, or it may be performed in response to operator demand.

In the case of motion video, the specific pixels that are undersampled may differ from frame to frame so as to blend pixels from the different frames and achieve an abstract motion video.

Thus, in one aspect, the invention provides an apparatus for displaying pixels from a digital image comprising means for selectively extracting less than all the pixels from the digital image, the extracted pixels being selected over the substantially the entire image, and means for displaying the extracted pixels against a background display in the same relative position as in the original image. A background generator may be provided so as to generate a background that enhances the selected pixels, such as a contrasting background, or in the case of displaying frames of a digital motion video sequence, the background may comprise pixels from previous frames in the sequence. If desired, further pixels may be selectively extracted from the image and those further pixels displayed so as to fill in the background. The pixels are selected for extraction by omitting rows or columns from the image, or by omitting all but one pixel in clusters of pixels, such as clusters of n×m pixels.

Because pixels are simply undersampled and the selected pixels displayed in their proper relative position against a predetermined background, abstract images can be accessed and displayed with acceptable delays. For example, by undersampling one pixel in a 4×4 cluster of 16 pixels (16:1 undersampling), the aforementioned 640×480 pixel gray scale image can be transmitted over a standard 9600 baud modem in about 15 seconds; and the aforementioned full color motion video can be accessed and displayed with only about 13,000,000 bit operations per second, which is well within the capabilities of today's personal computing equipment.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 5A–5D are views for explaining how background pixels are filled in by subsequent undersamplings of an image.

FIGS. 7A–7E are views for explaining how frames in a motion video sequences are undersampled.

FIG. 8 is a view for explaining various undersampling arrangements.

DETAILED DESCRIPTION OF THE INVENTION

Figure 1:
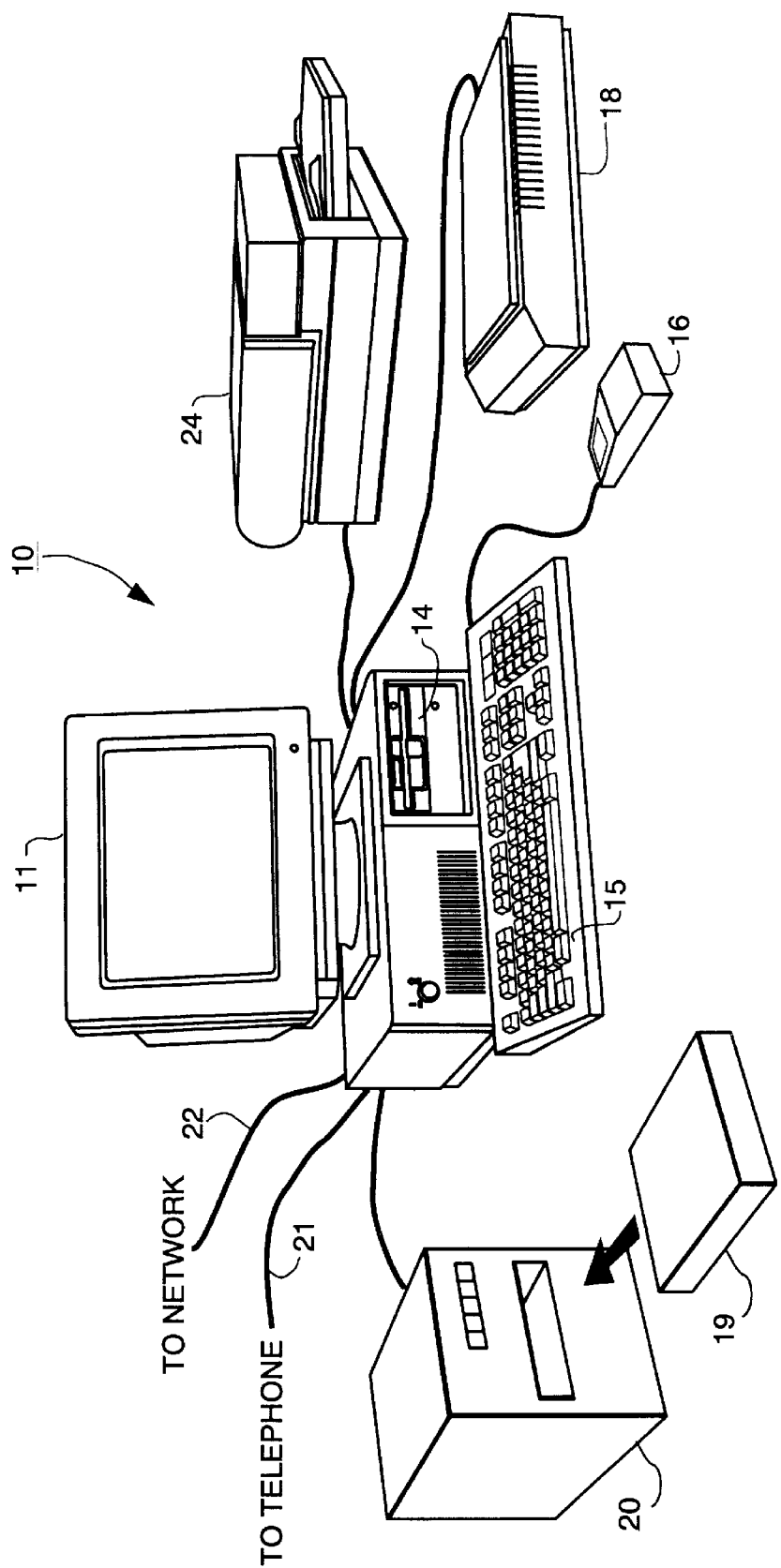
FIG. 1 is a perspective view showing the outward appearance of an apparatus according to the invention.

FIG. 1 is a view showing the outward appearance of a representative embodiment of the invention. Shown in FIG. 1 is computing equipment 10 such as an IBM-PC or PC-compatible computer provided with a display screen 11 such as a color monitor. Computing equipment 10 further includes a mass storage device such as computer disk drive 14 for storing data files, such as black-and-white images, gray scale images, color images, and motion video images; and for storing application programs which contain stored program instruction sequences for execution by the computing equipment, such as application programs to access data on disk drive 14 or on an optical disk or other data storage medium, or other information processing programs by which computing equipment 10 accesses and manipulates data files and presents data in those files to a computer operator via display screen 11.

A keyboard 15 is connected to computing equipment 10 to permit input of text data and to permit operator selection and manipulation of data displayed on display screen 11. Likewise, pointing device 16 such as a mouse or the like is provided to permit selection and manipulation of objects on the display screen. Scanner 18 scans documents or other images and provides bitmap images of those documents to computing equipment 10. Those images may be used immediately by computing equipment 10, or computing equipment 10 may store the images in disk drive 14 or on an optical disk such as disk 19 via optical disk drive 20. Image data may then be retrieved from optical disk 19 or computer disk drive 14 for subsequent processing by computing equipment 10.

Other means for supplying image data (and other data) may also be provided, such as telephone link 21 via an unshown modem, or a network link 22. Likewise, a removable floppy disk drive may be provided, or digital or analog video information may be input via an unshown video interface.

Printer 24 is provided for outputting information processed by computing equipment 10.

In accordance with computer operator instructions, stored application programs are selectively activated to process and manipulate data. For example, and as described in more detail below, an optical disk access program may be activated to permit an operator to scan in document images on scanner 18 and store them to optical disk 19, and to retrieve scanned-in document images from optical disk 19 in accordance with retrieval parameters. Other application programs such as image editing programs, word processing programs, spreadsheet programs, multimedia message management programs, and similar information processing programs may also be provided for operator selection and use.

Figure 2:
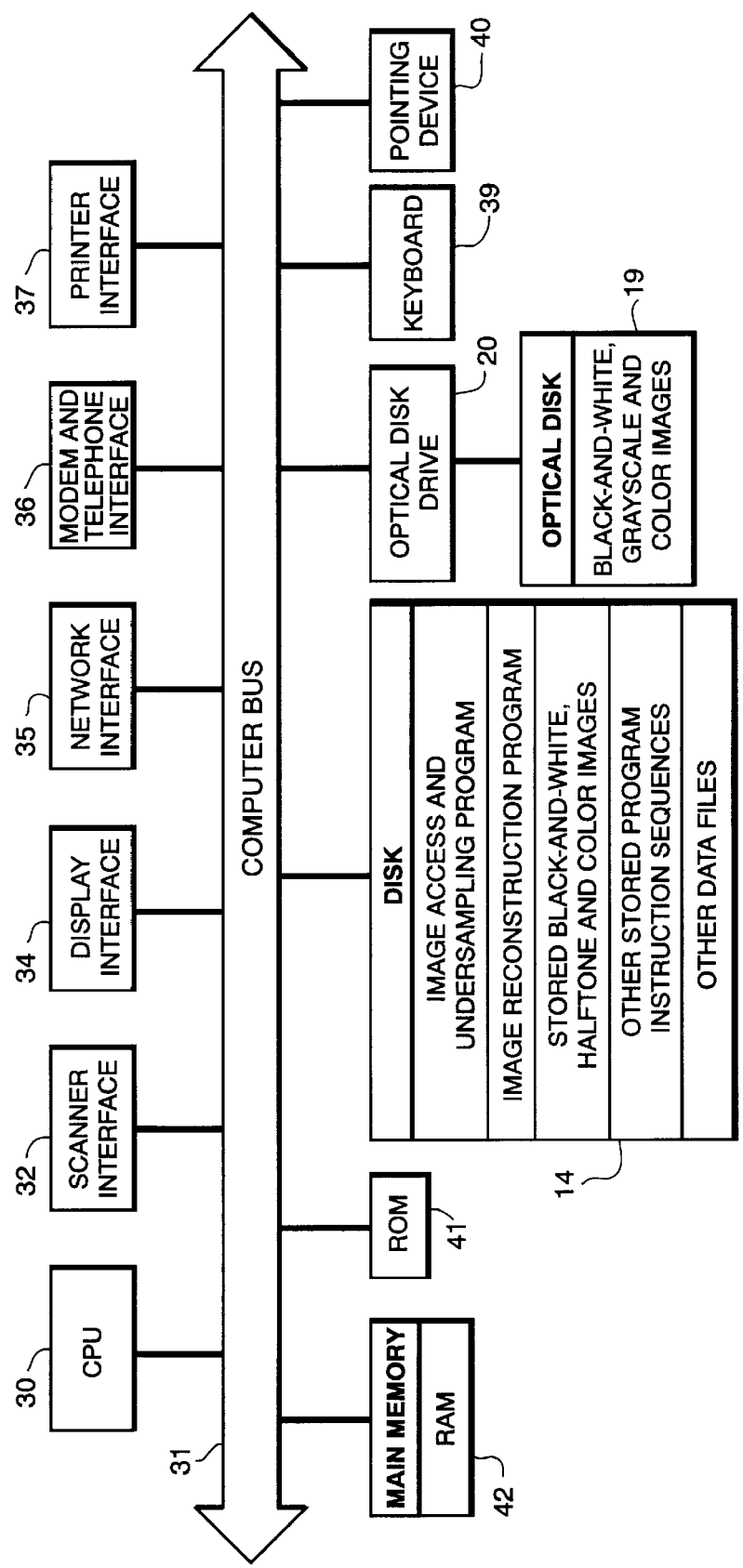
FIG. 2 is a block diagram of the FIG. 1 apparatus.

FIG. 2 is a detailed block diagram showing internal construction of computing equipment 10. As shown in FIG. 2, computing equipment 10 includes a central processing unit (CPU) 30 such as an 80386 or a reduced instruction set computer (RISC) interfaced to computer bus 31. Also interfaced to computer interface 31 is scanner interface 32 for interfacing to scanner 18, display interface 34 for interfacing to display 11, network interface 35 for interfacing to network line 22, modem and telephone interface 36 for interfacing to telephone line 21, printer interface 37 for interfacing to printer 34, keyboard interface 39 for interfacing to keyboard 15, and pointing interface 40 for interfacing with pointing device 16.

Read only memory (ROM) 41 interfaces to computer bus 31 so as to provide CPU 30 with specialized and invariant functions such as start up programs or BIOS programs. Main memory 42 provides CPU 30 with random access memory storage both for data and application programs, as required. In particular, when executing stored program instruction sequences, CPU 30 loads those instruction sequences from disk 14 (or other memory storage medium) into main memory 42 and executes those stored program instruction sequences out of the main memory.

As shown in FIG. 2, disk drive 14 includes stored program instruction sequences for accessing and displaying pixels from digital images. The digital images accessed and displayed in accordance with those instruction sequences are not necessarily stored on disk drive 14. Rather, as described above, digital images may be obtained from optical disk 19, or they may be transmitted to computing equipment 10 via network interface 22 or telephone interface 21. In situations where digital images are transmitted via telephone interface 21, then the access programs stored locally on disk drive 14 are not normally utilized to access those images. Rather, counterpart computing equipment is provided at a remote location, and that counterpart equipment accesses digital images in accordance with undersampling as described below. Thus, although the present embodiment describes local access and undersampling of digital images and subsequent local display, it is to be understood that access and undersampling may occur remotely from computing equipment 10, and the undersampled pixels transmitted to computing equipment 10 for local display.

Figure 3:
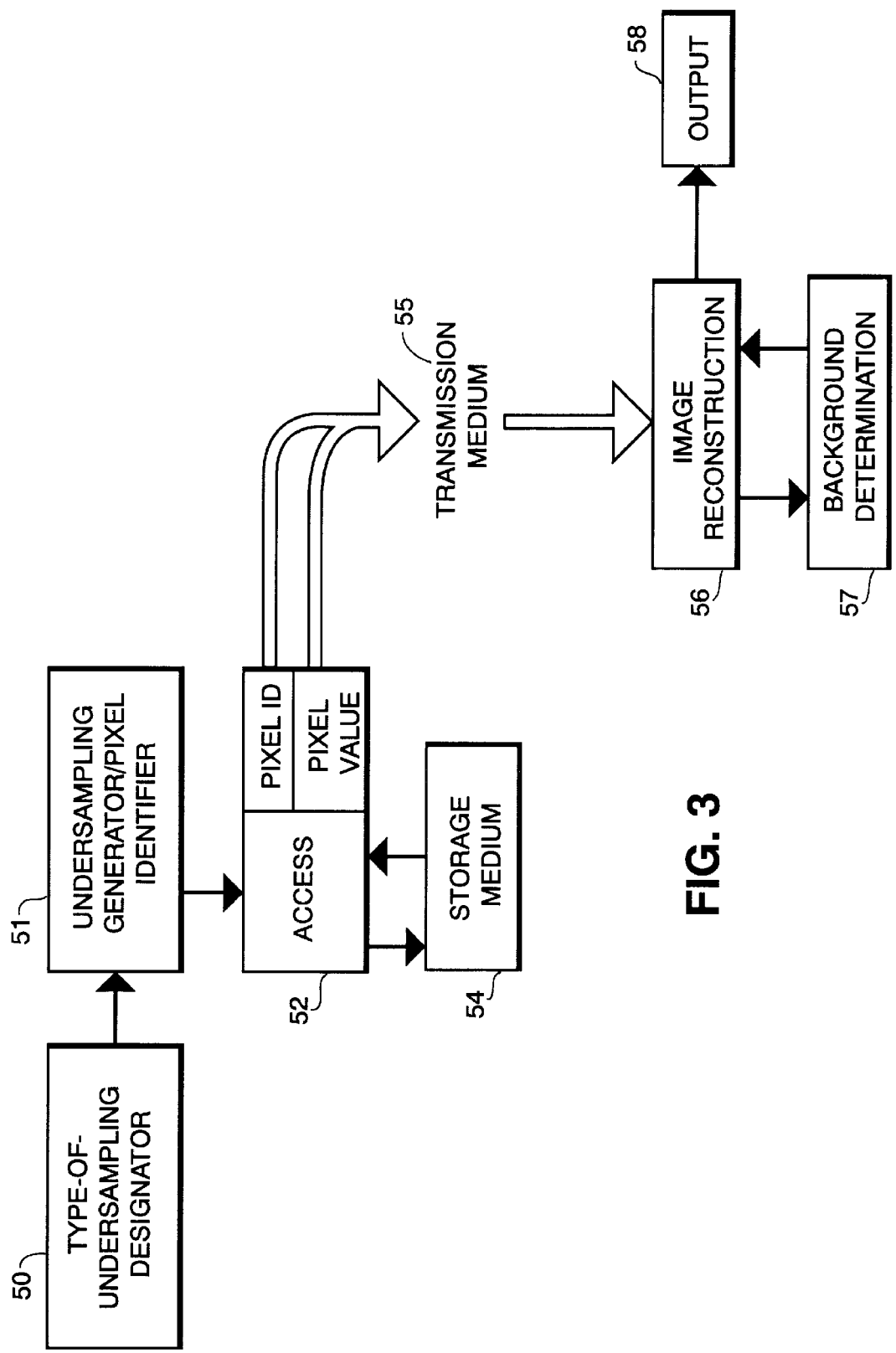
FIG. 3 is a functional block diagram of a system for displaying abstracted images of originals by undersampling pixels in the original and displaying the selected pixels.

FIG. 3 is a functional representation of stored program instruction sequences which provide the desired access, undersampling and display functions.

As shown in FIG. 3, designator 50 is provided to allow a computer operator to designate the type of undersampling desired. Designation may be made by way of a computerized menu of undersampling choices from which a computer operator may select the desired type of undersampling. Or, undersampling designation may be made by way of a default type of undersampling with provisions for overriding the default by the operator. As described hereinbelow, designation of undersampling includes designation of undersampling ratio (e.g., 4-to-1 or 9-to-1) as well as designation of undersampling sequence (e.g., row extraction, column extraction, cluster extraction, or the like).

Based on the type of undersampling designated by designator 50, generator 51 generates pixel identifiers for undersampling. Thus, in accordance with the type of undersampling designated by designator 50, generator 51 generates the identities of the pixels which are to be selectively extracted from the image. Pixel identities are generated by generator 51 such that pixels are selectively extracted at regular intervals over substantially the entire digital image, in accordance with the designated undersampling ratio and undersampling sequence.

Generator 51 provides the pixel identities to storage access means 52. In accordance with the identities generated by generator 51, storage access means 52 accesses the digital image stored on storage medium 54. The pixel value, together with the pixel identity or other identification of the undersampling routine generated by generator 51, are then provided to transmission medium 55 for transmission to display. In the system shown in FIG. 3, transmission medium can be any suitable medium, for example, modem or network transmission medium, or in the case of a stand-alone machine, the local computer bus. Likewise, the storage access means 52 and storage medium 54 are any of the above-described interfaces and corresponding storage devices.

The pixel values are received by image reconstruction device 56 which positions the pixels for display against a predetermined background. Image reconstructor 56 positions the extracted pixels against the background such that the position of one pixel relative to other pixels is preserved thereby preserving the original size and shape of the image.

The background is provided by background determination circuit 57 which provides a suitable background against which the extracted pixels are displayed. Background determination circuit 57 preferably provides a background that enhances the appearance of the extracted pixels. Thus, for example, an all white or all black background, depending on pixel content, may be selected for a gray scale image. Likewise, for a color image, a suitable color may be generated by circuit 57 to enhance the appearance of the selected color pixels.

In the case of motion video sequences, where the image accessed from storage medium 54 is one frame of a sequence of digital motion video frames, then image reconstruction device 56 displays the extracted pixels not against a static background determined by background determination circuit 57 but rather displays them against previous displays of the video sequence. More particularly, as described hereinbelow, for motion video sequences and for other sequences of related images, generator 51 generates a sequence of pixel identifiers that differ from one frame to the next frame, in accordance with the designated undersampling sequence, so that over a sequence of N frames the entire pixel field is sampled, although, of course, any one frame will still be undersampled. Thus, for motion video sequences, displaying abstractions built by undersampling each frame will preserve the apparent motion in the sequence, although moving objects will be somewhat blurred because of the abstraction process.

Image reconstruction device 56 then provides the reconstructed and abstracted image to output means 58.

Figure 4:
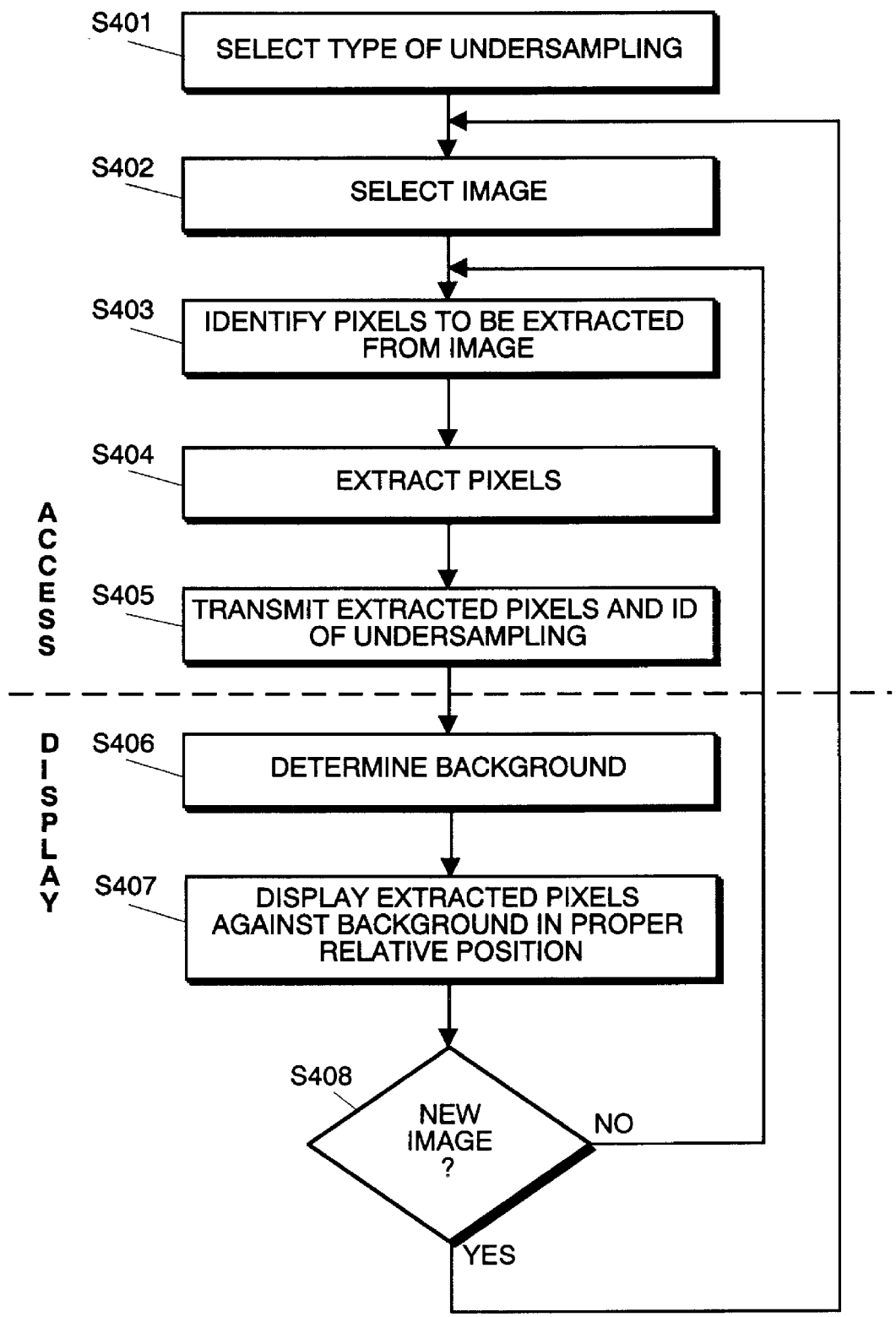
FIG. 4 is a flow diagram showing how pixels from an image are undersampled and the selected pixels then displayed.

FIG. 4 shows a flow diagram illustrating operation of the FIG. 3 embodiment. The process steps shown in FIG. 4 are executed by CPU 30 in accordance with stored program instruction sequences, as described above.

Steps S401 through S405 are process steps by which an image stored on storage medium 54 is accessed by undersampling the pixels in the image. Thus, in step S401, the type of undersampling desired is selected. As described above, selecting the type of undersampling includes selecting the undersampling ratio as well as the undersampling sequence. Selection may be made by way of a menu generated by CPU 30 and displayed on display 11, or selection may be made in accordance with a default type of undersampling which may be overridden by operator commands.

In step S402, the image that is to be abstracted is selected, whereupon flow advances to step S403 where generator 51 identifies pixels to be extracted from the image. Generator 51 identifies the pixels in accordance with the type of undersampling selected in step S401.

In step S404, access means 52 extracts pixels identified in step S403 from the image selected in step S402. Preferably, the pixel values are extracted without any additional processing; that is, the pixels are simply extracted from the image without averaging, weighting, cross-correlation or other smoothing techniques.

In step S405, the extracted pixels are transmitted to image reconstruction device 56 via transmission medium 55. Also transmitted to image reconstruction device 56 is an identification of the pixels that have been extracted, or an identification of the undersampling technique.

Steps S406 through S408 are process steps by which the undersampled image is displayed. Thus, in steps S406 and S407, image reconstruction device 56 displays extracted pixels received from the transmission medium against a predetermined background and in their proper relative position with respect to other pixels. Then, in step S408, CPU 30 determines whether a new image is to be selected for abstraction. If a new image has been selected for abstraction, then flow returns to step S402 so as to select the new image and repeat the abstraction process with the newly-selected image.

On the other hand, if a new image has not been selected for abstraction, then flow may, if desired, return to step S403 in which the currently-displayed image is re-abstracted, but with different pixels selected for abstraction. Re-abstraction can occur automatically, such as after an image has been displayed for a predetermined period of time, or manually based on operator interaction. Re-abstraction replaces background pixels with pixels of the image thereby creating a "sparkle" effect.

FIG. 5 illustrates re-abstraction in a situation where a 4:1 undersampling ratio has been selected. As shown in FIG. 5(*a*), in pass number 1, the pixels 60 from the original image are undersampled, and the extracted pixels 61 are displayed against a predetermined background 62. In pass number 2, as shown in FIG. 5(*b*), the process is repeated, but different pixels 63 are extracted. The process is repeated in passes 3 and 4 as shown in FIGS. 5(*c*) and 5(*d*), respectively, and each time different pixels 64 and 65, respectively are extracted. Thus, after N passes through an N:1 undersampling ratio, the entire original image has been filled in by successive image abstractions.

Figure 6:
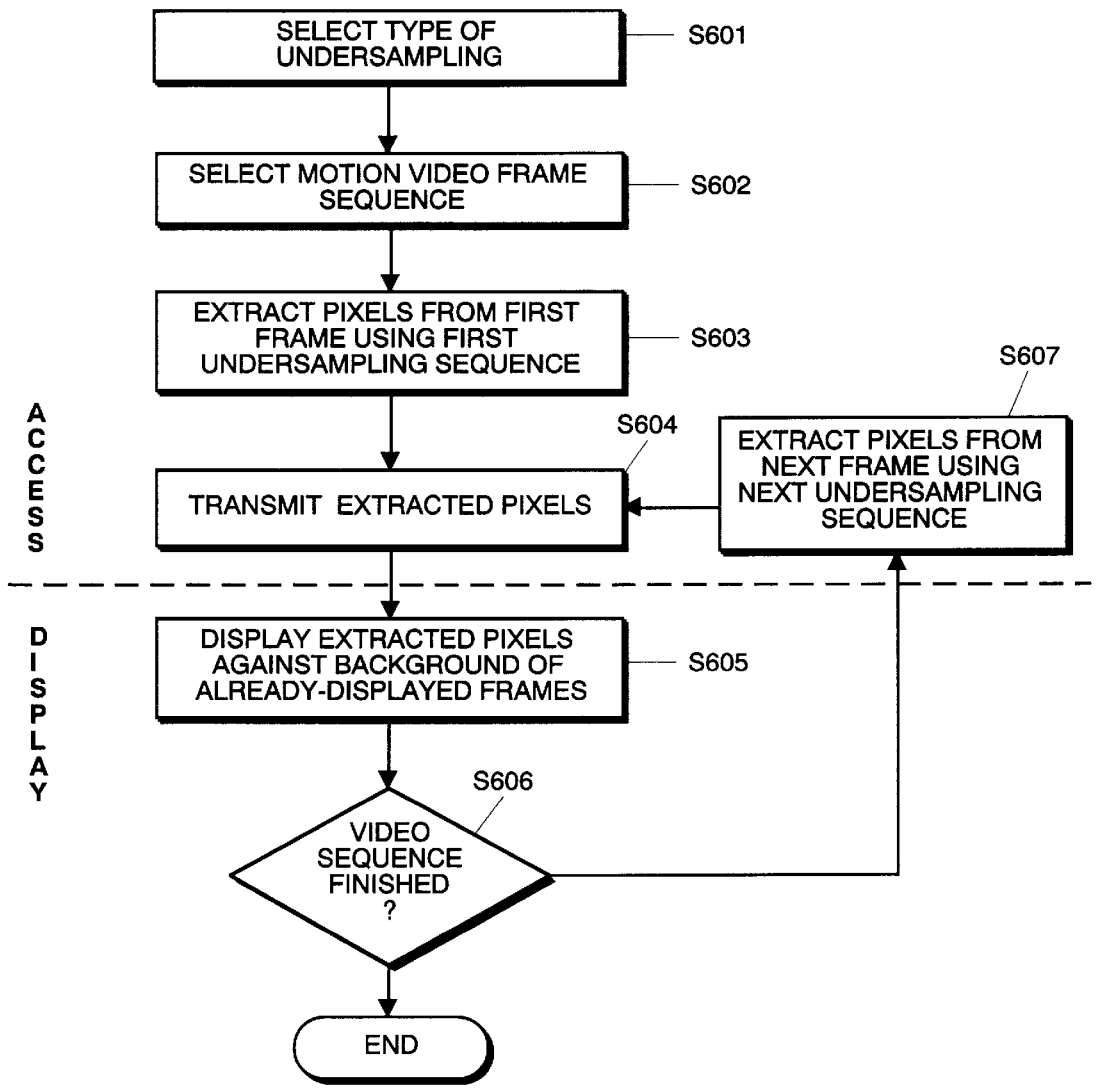
FIG. 6 is a flow diagram showing how motion video images are undersampled and the sampled pixels displayed.

FIG. 6 is a flow diagram illustrating operation of the FIG. 3 apparatus for displaying abstractions of frames from a motion video sequence.

In step S601, the type of undersampling is selected. As described above, the type of undersampling includes undersampling ratio and undersampling sequence.

In step S602, the motion video frame sequence is selected, and in step S603, pixels are extracted from the first frame of the motion video sequence using a first undersampling sequence. Each successive frame from the video sequence will be sampled by an undersampling sequence that differs from a previous undersampling sequence until N frames in an N:1 undersampling ratio have been processed. After N frames in an N:1 undersampling sequence have been processed, the undersampling sequence repeats.

In step S604, the extracted pixels are transmitted, and in step S605, the extracted pixels are displayed against a background of already-displayed frames of the video sequence.

If in step S606, processing of the video sequence has finished, then flow terminates. On the other hand, if processing of the video sequence has not yet finished, then flow returns to step S607 in which pixels from the next frame in the video sequence are extracted using the next undersampling sequence. As mentioned above, the next undersampling sequence differs from previous undersampling sequences so that different pixels are extracted. The undersampling sequence repeats after N frames have been processed in an N:1 undersampling ratio.

FIG. 7 is a representative diagram showing undersampling of frames of a motion video sequence using a 4:1 undersampling ratio. As shown in FIG. 7(a), pixels 70 from the first frame of the video sequence are undersampled yielding extracted pixels 71 which are displayed in proper pixel-to-pixel positional relationship against a background of already-displayed pixels from the motion video sequence. In FIG. 7(b), pixels 72 from the second frame of the motion video sequence are undersampled yielding extracted pixels 73 which are displayed against a background of already-displayed abstractions of prior frames. Likewise, in FIGS. 7(c) and 7(d), original pixels 74 and 75 from third and fourth frames, respectively, are undersampled to yield extracted pixels 76 and 77, respectively, which are displayed against a background of already-displayed frames from the video sequence. In FIG. 7(e), the undersampling sequence repeats itself so that extracted pixels 78 from the fifth frame of the motion video sequence replace extracted pixels 71 from the first frame, as shown.

Figure 8:
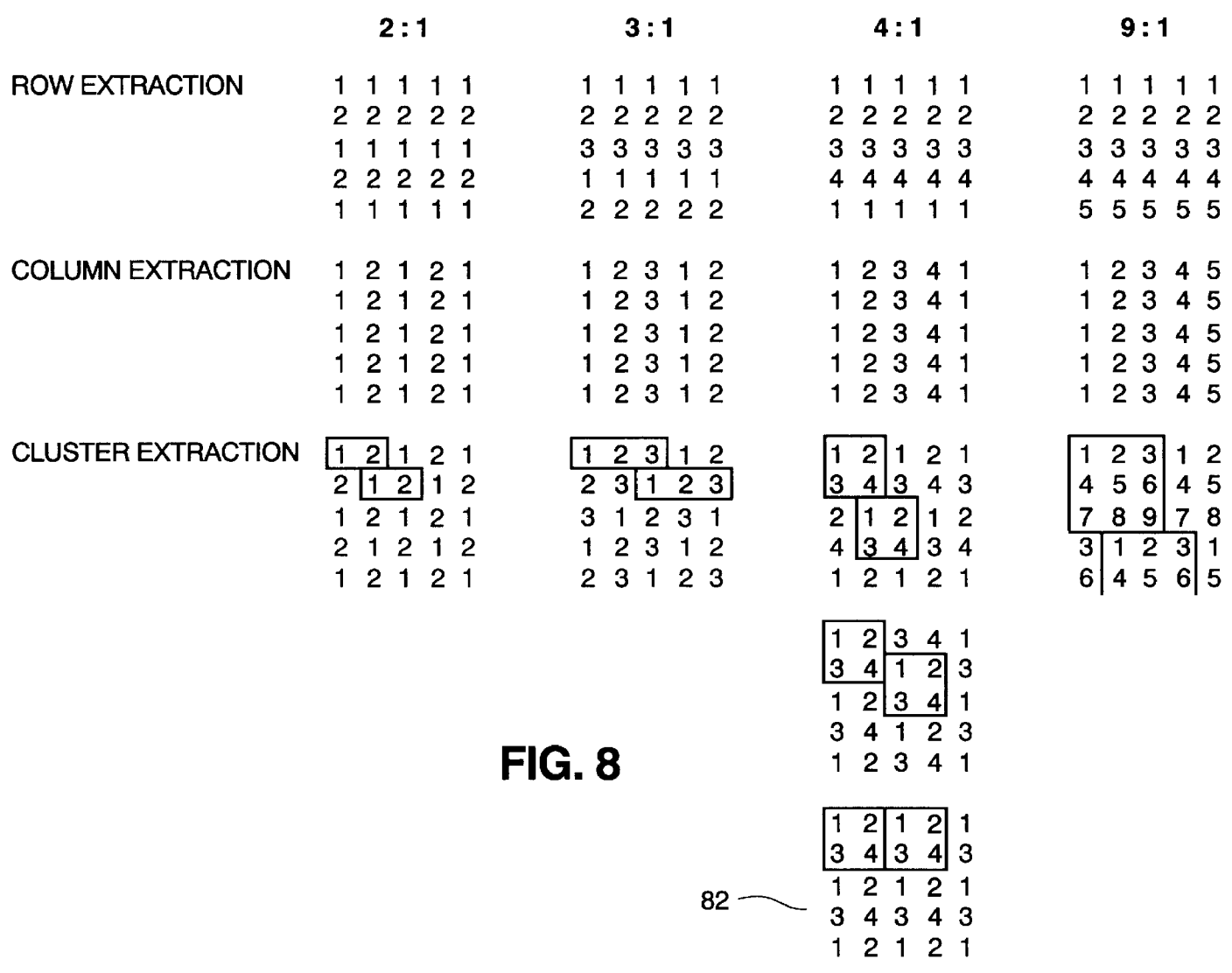

FIG. 8 shows representative undersampling sequences for various undersampling ratios. As shown in FIG. 8, undersampling may be performed by row extraction in which only every Nth row (for an N:1 undersampling ratio) is sampled and other rows are omitted. Likewise, undersampling may be performed by column extraction in which every Nth column (for an N:1 undersampling ratio) is sampled and other columns are omitted. In addition, undersampling may be performed by pixel cluster extraction in which only one pixel in a cluster of N pixels (for an N:1 undersampling ratio) is sampled and other pixels in the cluster are omitted. Preferably, the pixel clusters are staggered so that they overlap with each other either horizontally or vertically so as to reduce the prominence of continuous background areas in abstractions. On the other hand, it is often simpler to implement non-staggered and non-overlapped pixel clusters as shown at 82. In addition, while undersampling has been described above with respect to bit-wise undersampling, it is to be understood that byte-wise undersampling is also contemplated.

Figure 9:
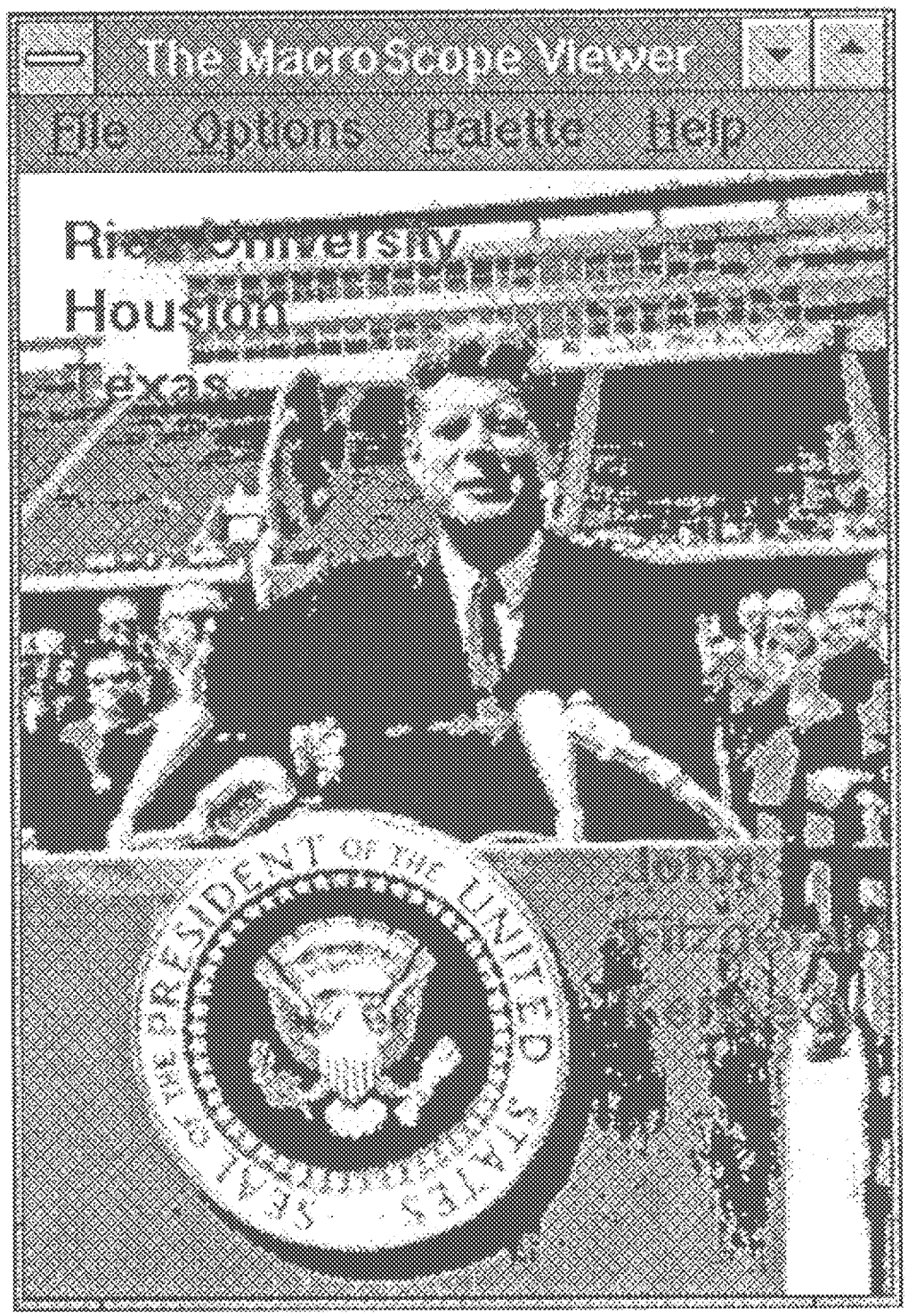
FIGS. 9 and 10 are views showing a representative original image and an abstraction of that image obtained by undersampling according to the invention.
Figure 10:

FIGS. 9 and 10 show representative gray scale images abstracted and displayed in accordance with the present invention. As shown in FIG. 9, a gray scale image represented by 16 different gray levels is accessed using a 4:1 undersampling ratio as shown at 82 in FIG. 8. The extracted pixels are displayed against a solid black background yielding the abstracted image shown in FIG. 10. As seen in FIG. 10, although finer details are lost by the process, the image is clearly recognizable and is well-suited for situations in which many such images must be browsed through at rapid speed.

What is claimed is:

1. An apparatus for displaying an abstract image of a digital image comprised of pixel data for each of a plurality of pixels, the abstract image and the digital image having substantially same sizes and orientations and using substantially the same pixel data for non-background pixels, said apparatus comprising:

designating means for designating one of a plurality of types of undersampling for the abstract image;

extracting means for selectively extracting less than all pixels from the digital image at substantially regular intervals based on the designated type of undersampling for the abstract image; and display means for displaying the pixel data for the extracted pixels, the pixel data being displayed against predetermined background pixels so as to form the abstract image of the digital image, the pixel data for the extracted pixels being displayed in substantially same positions in the abstract image as in the digital image and the predetermined background pixels being displayed in substantially same positions in the abstract image as unextracted pixels in the digital image, the abstract image having a size and an orientation substantially the same as the size and the orientation of the digital image.

2. An apparatus according to claim 1, further comprising a background generator for generating the predetermined background pixels.

3. An apparatus according to claim 2, wherein the predetermined background pixels generated by said background generator enhances a visibility of the extracted pixels.

4. An apparatus according to claim 2, wherein the digital image is one frame of a digital motion video sequence, and wherein the predetermined background pixels generated by said background generator are comprised by previous displays of the digital motion video sequence.

5. An apparatus according to claim 1, wherein said extracting means is operable to extract further pixels from the digital image for display by said display means.

6. An apparatus according to claim 5, wherein said extracting means is located remotely of said display means.

7. An apparatus according to claim 6, further comprising a transmission medium for transmitting pixels extracted by said extracting means to said display means.

8. An apparatus according to claim 7, wherein the extracted further pixels are transmitted in a group after the extracted pixels, and wherein said display means displays the extracted further pixels in place of predetermined background pixels in substantially same positions as in the digital image so as to increase a resolution of the abstract image.

9. An apparatus according to claim 1, wherein said extracting means selectively extracts pixels from clusters of pixels in the digital image.

10. An apparatus according to claim 9, wherein the clusters of pixels are staggered so as to overlap.

11. An apparatus according to claim 1, wherein said extracting means selectively extracts pixels in rows.

12. An apparatus according to claim 1, wherein said extracting means selectively extracts pixels in columns.

13. An apparatus according to claim 1, wherein said extracting means selectively extracts pixels using byte-wise extraction.

14. An apparatus according to claim 1, wherein the pixel data displayed in the abstract image and corresponding pixel data displayed in the digital image have substantially the same values.

15. An apparatus according to claim 14, wherein the extracting means extracts the pixels without performing any additional processing on the pixels being extracted.

16. An apparatus for displaying an abstract image of a digital image comprised of pixel data for each of a plurality of pixels, the abstract image and the digital image having substantially same sizes and orientations and using substantially the same pixel data for non-background pixels, said apparatus comprising:

designating means for designating one of a plurality of types of undersampling for the abstract image;

an undersampling generator for generating identifiers for pixels to be extracted from the digital image, the undersampling generator generating the identifiers in accordance with the type of undersampling designated by the designating means;

extracting means for extracting pixels from the digital image at substantially regular intervals based on the pixel identifiers generated by said undersampling generator; and an image reconstructor for positioning the pixel data for the pixels extracted by said extracting means against predetermined background pixels so as to form the abstract image of the digital image, the pixel data for the extracted pixels being positioned in substantially same positions in the abstract image as in the digital image and such that the predetermined background pixels are positioned in substantially same positions in the abstract image as unextracted pixels in the digital image, the abstract image having a size and an orientation substantially the same as the size and the orientation of the digital image.

17. An apparatus according to claim 16, wherein said undersampling generator is located remotely of said image reconstructor, and further comprising a transmission medium for transmitting pixels extracted by said extracting means to said image reconstructor.

18. An apparatus according to claim 16, further comprising a background generator for generating the predetermined background pixels, wherein the predetermined background pixels generated by said background generator are comprised by background pixels that enhance a visibility of the extracted pixels.

19. An apparatus according to claim 16, wherein the predetermined background pixels are comprised by previous displays of extracted pixels.

20. An apparatus according to claim 19, wherein the digital image is one frame of a digital motion video sequence, and wherein the predetermined background pixels are comprised by previous displays of pixels extracted from other frames of the digital motion video sequence.

21. An apparatus according to claim 16, wherein the plurality of types of undersampling include combinations of an undersampling ratio and an undersampling sequence.

22. An apparatus according to claim 21, wherein said undersampling generator generates pixel identifiers for subsequent digital images in accordance with an undersampling sequence of a designated type of undersampling.

23. An apparatus according to claim 22, wherein the predetermined background pixels are comprised by previous displays of extracted pixels in accordance with previous undersampling sequences.

24. An apparatus according to claim 23, wherein the digital image is one frame of a digital motion video sequence, and wherein the predetermined background pixels are comprised by previous displays of extracted pixels from other frames of the digital motion video sequence.

25. An apparatus according to claim 23, wherein said extracting means extracts further pixels from the digital image in accordance with the undersampling sequence of the designated type of undersampling.

26. An apparatus according to claim 25, wherein said extracting means is located remotely of said image reconstructor.

27. An apparatus according to claim 26, further comprising a transmission medium for transmitting pixels extracted by said extracting means to said image reconstructor.

28. An apparatus according to claim 27, wherein the extracted further pixels are transmitted in a group after the extracted pixels, and wherein said image reconstructor positions the extracted further pixels in place of predetermined background pixels in substantially same positions as in the digital image so as to increase a resolution of the abstract image.

29. An apparatus according to claim 16, wherein said undersampling generator generates pixel identifiers such that one pixel in clusters of pixels is identified and other pixels in the clusters of pixels are omitted.

30. An apparatus according to claim 29, wherein the clusters of pixels are staggered so as to overlap.

31. An apparatus according to claim 16, wherein said undersampling generator generates pixel identifiers such that pixels in rows are selected and pixels in other rows are omitted.

32. An apparatus according to claim 16, wherein said undersampling generator generates pixel identifiers such that pixels in columns are selected and pixels in other columns are omitted.

33. An apparatus according to claim 16, wherein said undersampling generator generates pixel identifiers in bytes using byte-wise identification.

34. An apparatus according to claim 16, wherein the pixel data displayed in the abstract image and corresponding pixel data in the digital image have substantially the same values.

35. An apparatus according to claim 34, wherein the extracting means extracts the pixels without performing any additional processing on the pixels being extracted.

36. A method for displaying an abstract image of a digital image comprised of pixel data for each of a plurality of pixels, the abstract image and the digital image having substantially same sizes and orientations and using substantially the same pixel data for non-background pixels, said method comprising the steps of:

designating one of a plurality of types of undersampling for the abstract image;

selectively extracting, at substantially regular intervals, less than all pixels from the digital image based on the designated type of undersampling for the abstract image; and displaying the pixel data for the extracted pixels, the pixel data being displayed against predetermined background pixels so as to form the abstract image of the digital image, the pixel data for the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

37. A method according to claim 36, further comprising the step of generating the predetermined background pixels.

38. A method according to claim 37, wherein the predetermined background pixels generated in said step of generating are comprised by background pixels which enhance a visibility of the extracted pixels.

39. A method according to claim 37, wherein the digital image is one frame of a digital motion video sequence, and wherein the predetermined background pixels generated in said step of generating are comprised by previous displays of the digital motion video sequence.

40. A method according to claim 36, further comprising a step of extracting further pixels from the digital image for display in said step of displaying.

41. A method according to claim 40, wherein said step of displaying displays the abstract image on a display means, and wherein said step of selectively extracting is performed by an extracting means located remotely of said display means.

42. A method according to claim 41, further comprising the steps of:

transmitting pixels extracted by the extracting means to the display means via a transmission medium;

transmitting the extracted further pixels from the extracting means to the display means after the abstract image is formed; and displaying the extracted further pixels in place of predetermined background pixels in substantially same positions as in the digital image so as to increase a resolution of the abstract image.

43. A method according to claim 36, wherein said step of selectively extracting extracts pixels from clusters of pixels in the digital image.

44. A method according to claim 43, wherein the clusters of pixels are staggered so as to overlap.

45. A method according to claim 36, wherein said step of selectively extracting extracts pixels in rows.

46. A method according to claim 36, wherein said step of selectively extracting extracts pixels in columns.

47. A method according to claim 36, wherein said step of selectively extracting extracts pixels using byte-wise extraction.

48. A method according to claim 36, wherein the pixel data displayed in the abstract image and corresponding pixel data in the digital image have substantially the same values.

49. A method according to claim 48, wherein the extracting step extracts the pixels without performing any additional processing on the pixels being extracted.

50. A method for displaying an abstract image of a digital image comprised of pixel data for each of a plurality of pixels, the abstract image and the digital image having substantially same sizes and orientations and using substantially the same pixel data for non-background pixels, said method comprising the steps of:

designating one of a plurality of types of undersampling for the abstract image;

generating identifiers for pixels in the digital image that are to be extracted, the pixel identifiers being generated in accordance with the type of undersampling designated in the designating step;

extracting pixels from the digital image at substantially regular intervals in accordance with the pixel identifiers generated in said step of generating; and displaying the pixel data for the extracted pixels, the pixel data being displayed against predetermined background pixels so as to form the abstract image of the digital image, the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

51. A method according to claim 50, wherein said step of generating is executed at a first location and said step of displaying is executed at a second location remote from the first location, and further comprising the step of transmitting the pixels extracted in said step of extracting from the first location to the second location.

52. A method according to claim 50, further comprising a step of generating the predetermined background pixels using a background generator, wherein the predetermined background pixels are comprised by background pixels that enhances a visibility of the extracted pixels.

53. A method according to claim 50, wherein the predetermined background pixels are comprised by previous displays of extracted pixels.

54. A method according to claim 53, wherein the digital image is one frame of a digital motion video sequence, and wherein the predetermined background pixels are comprised by previous displays of pixels extracted from other frames of the motion video sequence.

55. A method according to claim 50, wherein the plurality of types of undersampling include combinations of an undersampling ratio and an undersampling sequence.

56. A method according to claim 55, further comprising a second step of generating pixel identifiers for subsequent digital images in accordance with an undersampling sequence in a designated type of undersampling.

57. A method according to claim 56, wherein the predetermined background pixels are comprised by previous displays of extracted pixels in accordance with previous undersampling sequences.

58. A method according to claim 57, wherein the digital image is one frame of a digital motion video sequence, and wherein the predetermined background pixels are comprised by previous displays of extracted pixels from other frames of the digital motion video sequence.

59. A method according to claim 57, further comprising a second step of extracting further pixels from the digital image in accordance with the undersampling sequence in the designated type of undersampling.

60. A method according to claim 59, wherein said step of displaying displays the abstract image on a display means, and wherein said step of extracting is performed by an extracting means located remotely of said display means.

61. A method according to claim 60, further comprising the steps of:

transmitting pixels extracted by the extracting means to the display means via a transmission medium;

transmitting the extracted further pixels from the extracting means to the display means after the abstract image is formed; and displaying the extracted further pixels in place of predetermined background pixels in substantially same positions as in the digital image so as to increase a resolution of the abstract image.

62. A method according to claim 50, wherein said step of generating generates pixel identifiers such that one pixel in clusters of pixels is identified and other pixels in the clusters of pixels are omitted.

63. A method according to claim 62, wherein the clusters of pixels are staggered so as to overlap.

64. A method according to claim 50, wherein said step of generating generates pixel identifiers such that pixels in rows are selected and pixels in other rows are omitted.

65. A method according to claim 50, wherein said step of generating generates pixel identifiers such that pixels in columns are selected and pixels in other columns are omitted.

66. A method according to claim 50, wherein said step of generating generates pixel identifiers in bytes using byte-wise identification.

67. A method according to claim 50, wherein the pixel data displayed in the abstract image and corresponding pixel data in the digital image have substantially the same values.

68. A method according to claim 67, wherein the extracting step extracts the pixels without performing any additional processing on the pixels being extracted.

69. An apparatus for displaying an abstract image of a digital image comprised of pixel data for each of a plurality of pixels, the abstract image and the digital image having substantially same sizes and orientations and using substantially the same pixel data for non-background pixels, said apparatus comprising:

an image memory for storing the digital image;

a program memory for storing program instruction sequences; and a processor for executing the program instruction sequences stored in said program memory;

wherein the program instruction sequences stored in said program memory include steps for (a) designating one of a plurality of types of undersampling for the abstract image based on an external input, (b) generating identifiers for pixels in the digital image that are to be extracted, the pixel identifiers being generated in accordance with the designated type of undersampling, (c) extracting pixels from the digital image at substantially regular intervals in accordance with the pixel identifiers generated in the step of generating, and (d) displaying the pixel data for the extracted pixels, the pixel data being displayed against predetermined background pixels so as to form the abstract image of the digital image, the pixel data for the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

70. An apparatus according to claim 69, wherein the program instruction sequences stored in said program memory further include steps for receiving extracted pixels that are generated at a remote location, and for displaying the received pixels.

71. An apparatus according to claim 69, wherein the program instruction sequences stored in said program memory further comprise a step of generating the predetermined background pixels, and wherein the predetermined background pixels are comprised by a background that enhances a visibility of the extracted pixels.

72. An apparatus according to claim 69, wherein the predetermined background pixels are comprised by previous displays of extracted pixels.

73. An apparatus according to claim 72, wherein said image memory stores plural digital images which together comprise a digital motion video sequence, wherein the digital image from which pixels are extracted is one frame of the digital motion video sequence, and wherein the predetermined background pixels are comprised by previous displays of pixels extracted from other frames of the digital motion video sequence.

74. An apparatus according to claim 69, wherein the plurality of types of undersampling include combinations of an undersampling ratio and an undersampling sequence.

75. An apparatus according to claim 74, wherein pixel identifiers are generated for subsequent digital images in accordance with an undersampling sequence of a designated type of undersampling.

76. An apparatus according to claim 75, wherein the predetermined background is comprised by previous displays of extracted pixels in accordance with previous undersampling sequences.

77. An apparatus according to claim 76, wherein said image memory stores plural digital images which together comprise a digital motion video sequence, wherein the digital image from which pixels are extracted is one frame of the digital motion video sequence, and wherein the predetermined background pixels are comprised by previous displays of extracted pixels from other frames of the digital motion video sequence.

78. An apparatus according to claim 76, wherein the program instruction sequences further comprise a step for extracting further pixels from the digital image in accordance with the undersampling sequence of the designated type of undersampling.

79. An apparatus according to claim 69, wherein pixel identifiers are generated such that one pixel in clusters of pixels is identified and other pixels in the clusters of pixels are omitted.

80. An apparatus according to claim 79, wherein the clusters of pixels are staggered so as to overlap.

81. An apparatus according to claim 69, wherein pixel identifiers are generated such that pixels in rows are selected and pixels in other rows are omitted.

82. An apparatus according to claim 69, wherein pixel identifiers are generated such that pixels in columns are selected and pixels in other columns are omitted.

83. An apparatus according to claim 69, wherein pixel identifiers are generated in bytes using byte-wise identification.

84. An apparatus according to claim 69, wherein the pixel data displayed in the abstract image and corresponding pixel data in the digital image have substantially the same values.

85. An apparatus according to claim 84, wherein the program instructions for extracting pixels comprise instructions for extracting the pixels without performing any additional processing on the pixels being extracted.

86. An apparatus which displays an abstract image of a digital image comprised of pixel data for each of a plurality of pixels, and which increases a resolution of the abstract image in response to a predetermined condition, said apparatus comprising:

a designating means for designating one of a plurality of types of undersampling for the abstract image;

an extracting means for extracting pixels from the digital image at substantially regular intervals based on the designated type of undersampling, and for subsequently extracting pixels from the digital image in response to a predetermined condition;

an image reconstructor, located remotely from said extracting means, for constructing an abstract image from pixel data for the extracted pixels and from predetermined background pixels, the pixel data for the extracted pixels being displayed against the predetermined background pixels in the abstract image, the extracted pixels being located in substantially same positions in the abstract image as in the digital image, and the predetermined background pixels being located in substantially same positions in the abstract image as unextracted pixels in the digital image, the abstract image having a size and an orientation substantially the same as the size and the orientation of the digital image; and a transmission medium for transmitting extracted pixels from said extracting means to said image reconstructor;

wherein, in response to the predetermined condition, subsequently-extracted pixels are transmitted from said extracting means to said image reconstructor; and wherein, when said image reconstructor receives the subsequently-extracted pixels transmitted in response to the predetermined condition, said image reconstructor replaces predetermined background pixels in the abstract image with pixel data for the subsequently-extracted pixels, the pixel data for the subsequently-extracted pixels being placed in substantially same positions in the abstract image as in the digital image so as to increase a resolution of the abstract image.

87. An apparatus according to claim 86, wherein the pixel data displayed in the abstract image and corresponding pixel data in the digital image have substantially the same values.

88. An apparatus according to claim 87, wherein the extracting means extracts the pixels without performing any additional processing on the pixels being extracted.

89. Computer-executable process steps stored on a computer-readable medium, the computer executable process steps to display an abstract image of a digital image comprised of pixel data for each of a plurality of pixels, the abstract image and the digital image having substantially same sizes and orientations and using substantially the same pixel data for non-background pixels, the computer-executable process steps comprising:

code to designate one of a plurality of types of under-sampling for the abstract image;

code to selectively extract, at substantially regular intervals, less than all pixels from the digital image based on the designated type of undersampling for the abstract image; and code to display the pixel data for the extracted pixels, the pixel data being displayed against predetermined background pixels so as to form the abstract image of the digital image, the pixel data for the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

90. Computer-executable process steps according to claim 89, further comprising code to generate the predetermined background pixels.

91. Computer-executable process steps according to claim 90, wherein the predetermined background pixels generated by the code to generate are comprised by background pixels which enhance a visibility of the extracted pixels.

92. Computer-executable process steps according to claim 90, wherein the digital image is one frame of a digital motion video sequence, and wherein the predetermined background pixels generated by the code to generate are comprised by previous displays of the digital motion video sequence.

93. Computer-executable process steps according to claim 89, further comprising code to extract further pixels from the digital image for display by the code to display.

94. Computer-executable process steps according to claim 93, wherein the code to display displays the abstract image on a display means, and wherein the code to selectively extract is executed by an extracting means located remotely of the display means.

95. Computer-executable process steps according to claim 94, further comprising:

code to transmit pixels extracted by the extracting means to the display means via a transmission medium;

code to transmit the extracted further pixels from the extracting means to the display means after the abstract image is formed; and code to display the extracted further pixels in place of predetermined background pixels in substantially same relative positions as in the digital image so as to increase a resolution of the abstract image.

96. Computer-executable process steps according to claim 89, wherein the code to selectively extract extracts pixels from clusters of pixels in the digital image.

97. Computer-executable process steps according to claim 96, wherein the clusters of pixels are staggered so as to overlap.

98. Computer-executable process steps according to claim 89, wherein the code to selectively extract extracts pixels in rows.

99. Computer-executable process steps according to claim 89, wherein the code to selectively extract extracts pixels in columns.

100. Computer-executable process steps according to claim 89, wherein the code to selectively extract extracts pixels using byte-wise extraction.

101. Computer-executable process steps according to claim 89, wherein the pixel data displayed in the abstract image and corresponding pixel data in the digital image have substantially the same values.

102. Computer-executable process steps according to claim 101, wherein the code to extract extracts the pixels without performing any additional processing on the pixels being extracted.

103. Computer-executable process steps stored on a computer-readable medium, the computer executable process steps to display an abstract image of a digital image comprised of pixel data for each of a plurality of pixels, the abstract image and the digital image having substantially same sizes and orientations and using substantially the same pixel data for non-background pixels, the computer-executable process steps comprising:

code to designate one of a plurality of types of under-sampling for the abstract image;

code to generate identifiers for pixels in the digital image that are to be extracted, the pixel identifiers being generated in accordance with the type of undersampling designated by the code to designate;

code to extract pixels from the digital image at substantially regular intervals in accordance with the pixel identifiers generated by the code to generate; and code to display the pixel data for the extracted pixels, the pixel data being displayed against predetermined background pixels so as to form the abstract image, the pixel data for the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

104. Computer-executable process steps according to claim 103, wherein the code to generate is executed at a first location and the code to display is executed at a second location remote from the first location, and further comprising code to transmit the pixels extracted by the code to extract from the first location to the second location.

105. Computer-executable process steps according to claim 103, further comprising code to generate the predetermined background pixels using a background generator, wherein the predetermined background pixels are comprised by background pixels that enhance a visibility of the extracted pixels.

106. Computer-executable process steps according to claim 103, wherein the predetermined background pixels are comprised by previous displays of extracted pixels.

107. Computer-executable process steps according to claim 106, wherein the digital image is one frame of a digital motion video sequence, and wherein the predetermined background pixels are comprised by previous displays of pixels extracted from other frames of the motion video sequence.

108. Computer-executable process steps according to claim 103, wherein the plurality of types of undersampling include combinations of an undersampling ratio and an undersampling sequence.

109. Computer-executable process steps according to claim 108, further comprising code to generate pixel identifiers for subsequent digital images in accordance with an undersampling sequence in a designated type of undersampling.

110. Computer-executable process steps according to claim 109, wherein the predetermined background pixels are comprised by previous displays of extracted pixels in accordance with previous undersampling sequences.

111. Computer-executable process steps according to claim 110, wherein the digital image is one frame of a digital motion video sequence, and wherein the predetermined background pixels are comprised by previous displays of extracted pixels from other frames of the digital motion video sequence.

112. Computer-executable process steps according to claim 110, further comprising code to extract further pixels from the digital image in accordance with the undersampling sequence in the designated type of undersampling.

113. Computer-executable process steps according to claim 112, wherein the code to display displays the abstract image on a display means, and wherein the code to extract is executed by an extracting means located remotely of the display means.

114. Computer-executable process steps according to claim 113, further comprising:
code to transmit pixels extracted by the extracting means to the display means via a transmission medium;
code to transmit the extracted further pixels from the extracting means to the display means after the abstract image is formed; and
code to display the extracted further pixels in place of predetermined background pixels in substantially same relative positions as in the digital image so as to increase a resolution of the abstract image.

115. Computer-executable process steps according to claim 103, wherein the code to generate generates pixel identifiers such that one pixel in clusters of pixels is identified and other pixels in the clusters of pixels are omitted.

116. Computer-executable process steps according to claim 103, wherein the clusters of pixels are staggered so as to overlap.

117. Computer-executable process steps according to claim 103, wherein the code to generate generates pixel identifiers such that pixels in rows are selected and pixels in other rows are omitted.

118. Computer-executable process steps according to claim 103, wherein the code to generate generates pixel identifiers such that pixels in columns are selected and pixels in other columns are omitted.

119. Computer-executable process steps according to claim 103, wherein the code to generate generates pixel identifiers in bytes using byte-wise identification.

120. Computer-executable process steps according to claim 103, wherein the pixel data displayed in the abstract image and corresponding pixel data in the digital image have substantially the same values.

121. Computer-executable process steps according to claim 120, wherein the code to extract extracts the pixels without performing any additional processing on the pixels being extracted.

122. A computer-readable medium which stores computer-executable process steps, the computer-executable process steps to display an abstract image of a digital image comprised of pixel data for each of a plurality of pixels, the abstract image and the digital image having substantially same sizes and orientations and using substantially the same pixel data for non-background pixels, the computer-executable process steps comprising:
a designating step to designate one of a plurality of types of undersampling for the abstract image;
an extracting step to selectively extract, at substantially regular intervals, less than all pixels from the digital image based on the designated type of undersampling for the abstract image; and
a displaying step to display the pixel data for the extracted pixels, the pixel data being displayed against predetermined background pixels so as to form the abstract image of the digital image, the pixel data for the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

123. A computer-readable medium according to claim 122, further comprising a generating step to generate the predetermined background pixels.

124. A computer-readable medium according to claim 123, wherein the predetermined background pixels generated in the generating step are comprised by background pixels which enhance a visibility of the extracted pixels.

125. A computer-readable medium according to claim 123, wherein the digital image is one frame of a digital motion video sequence, and wherein the predetermined background pixels generated in the generating step are comprised by previous displays of the digital motion video sequence.

126. A computer-readable medium according to claim 122, further comprising an extracting step to extract further pixels from the digital image for display in the displaying step.

127. A computer-readable medium according to claim 126, wherein the displaying step displays the abstract image on a display means, and wherein the extracting step is performed by an extracting means located remotely of the display means.

128. A computer-readable medium according to claim 127, further comprising:
a transmitting step to transmit pixels extracted by the extracting means to the display means via a transmission medium;
a transmitting step to transmit the extracted further pixels from the extracting means to the display means after the abstract image is formed; and
a displaying step to display the extracted further pixels in place of predetermined background pixels in substantially same relative positions as in the digital image so as to increase a resolution of the abstract image.

129. A computer-readable medium according to claim 122, wherein the extracting step selectively extracts pixels from clusters of pixels in the digital image.

130. A computer-readable medium according to claim 129, wherein the clusters of pixels are staggered so as to overlap.

131. A computer-readable medium according to claim 122, wherein the extracting step selectively extracts pixels in rows.

132. A computer-readable medium according to claim 122, wherein the extracting step selectively extracts pixels in columns.

133. A computer-readable medium according to claim 122, wherein the extracting step selectively extracts pixels using byte-wise extraction.

134. A computer-readable medium according to claim 122, wherein the pixel data displayed in the abstract image and corresponding pixel data in the digital image have substantially the same values.

135. A computer-readable medium according to claim 134, wherein the extracting step extracts the pixels without performing any additional processing on the pixels being extracted.

136. A computer-readable medium which stores computer-executable process steps, the computer-executable process steps to display an abstract image of a digital image comprised of pixel data for each of a plurality of pixels, the abstract image and the digital image having substantially same sizes and orientations and using substantially the same pixel data for non-background pixels, the computer-executable process steps comprising:

a designating step to designate one of a plurality of types of undersampling for the abstract image;

a generating step to generate identifiers for pixels in the digital image that are to be extracted, the pixel identifiers being generated in accordance with the type of undersampling designated in the designating step;

an extracting step to extract pixels from the digital image at substantially regular intervals in accordance with the pixel identifiers generated in the generating step; and a displaying step to display the pixel data for the extracted pixels, the pixel data being displayed against predetermined background pixels so as to form the abstract image of the digital image, the pixel data for the extracted pixels being displayed in substantially same positions in the abstract image as in the digital image, and the predetermined background pixels being displayed in substantially same positions in the abstract image as unextracted pixels in the digital image, the abstract image having a size and an orientation substantially the same as the size and the orientation of the digital image.

137. A computer-readable medium according to claim 136, wherein the generating step is executed at a first location and the displaying step is executed at a second location remote from the first location, and further comprising the step of transmitting the pixels extracted in the extracting step from the first location to the second location.

138. A computer-readable medium according to claim 136, further comprising a generating step to generate the predetermined background pixels using a background generator, wherein the predetermined background pixels are comprised by background pixels that enhance a visibility of the extracted pixels.

139. A computer-readable medium according to claim 136, wherein the predetermined background pixels are comprised by previous displays of extracted pixels.

140. A computer-readable medium according to claim 139, wherein the digital image is one frame of a digital motion video sequence, and wherein the predetermined background pixels are comprised by previous displays of pixels extracted from other frames of the motion video sequence.

141. A computer-readable medium according to claim 136, wherein the plurality of types of undersampling include combinations of an undersampling ratio and an undersampling sequence.

142. A computer-readable medium according to claim 141, further comprising a second generating step to generate pixel identifiers for subsequent digital images in accordance with an undersampling sequence in a designated type of undersampling.

143. A computer-readable medium according to claim 142, wherein the predetermined background pixels are comprised by previous displays of extracted pixels in accordance with previous undersampling sequences.

144. A computer-readable medium according to claim 143, wherein the digital image is one frame of a digital motion video sequence, and wherein the predetermined background pixels are comprised by previous displays of extracted pixels from other frames of the digital motion video sequence.

145. A computer-readable medium according to claim 143, further comprising a second extracting step to further extract pixels from the digital image in accordance with the undersampling sequence in the designated type of undersampling.

146. A computer-readable medium according to claim 145, wherein the displaying step displays the abstract image on a display means, and wherein the extracting step is performed by an extracting means located remotely of the display means.

147. A computer-readable medium according to claim 146, further comprising:

a first transmitting step to transmit pixels extracted by the extracting means to the display means via a transmission medium;

a second transmitting step to transmit the extracted further pixels from the extracting means to the display means after the abstract image is formed; and a displaying step to display the extracted further pixels in place of predetermined background pixels in substantially same relative positions as in the digital image so as to increase a resolution of the abstract image.

148. A computer-readable medium according to claim 136, wherein the generating step generates pixel identifiers such that one pixel in clusters of pixels is identified and other pixels in the clusters of pixels are omitted.

149. A computer-readable medium according to claim 136, wherein the clusters of pixels are staggered so as to overlap.

150. A computer-readable medium according to claim 136, wherein the generating step generates pixel identifiers such that pixels in rows are selected and pixels in other rows are omitted.

151. A computer-readable medium according to claim 136, wherein the generating step generates pixel identifiers such that pixels in columns are selected and pixels in other columns are omitted.

152. A computer-readable medium according to claim 136, wherein the generating step generates pixel identifiers in bytes using byte-wise identification.

153. A computer-readable medium according to claim 136, wherein the pixel data displayed in the abstract image and corresponding pixel data in the digital image have substantially the same values.

154. A computer-readable medium according to claim 153, wherein the extracting step extracts the pixels without performing any additional processing on the pixels being extracted.

* * * * *

UNITED STATES PATENT AND TRADEMARK OFFICE
CERTIFICATE OF CORRECTION

PATENT NO. : 5,844,568

DATED : December 1, 1998

INVENTOR(S) : Willis J. Luther

It is certified that error appears in the above-identified patent and that said Letters Patent is hereby corrected as shown below:

COLUMN 1

Line 6, change "08/21.21," to --08/214,621,--; and
line 22, change "common place" to --commonplace--.

COLUMN 2

Line 25, change "over the" to --over--.

COLUMN 3

Line 6, change "in a" to --in--.

COLUMN 8

Line 12, change "image" to --image,--; and
line 23, change "enhances" to --enhance--.

COLUMN 9

Line 17, change "image" to --images,--.

UNITED STATES PATENT AND TRADEMARK OFFICE
CERTIFICATE OF CORRECTION

PATENT NO. : 5,844,568

DATED : December 1, 1998

INVENTOR(S) : Willis J. Luther

It is certified that error appears in the above-identified patent and that said Letters Patent is hereby corrected as shown below:

<u>COLUMN 12</u>

Line 4, change "enhances" to --enhance--.

Signed and Sealed this

Tenth Day of August, 1999

Attest:

Q. TODD DICKINSON

*Attesting Officer*  *Acting Commissioner of Patents and Trademarks*